(No Model.)
A. R. PRITCHARD.
VESSEL HANDLE.
No. 605,828.　　　　　　　　　Patented June 14, 1898.
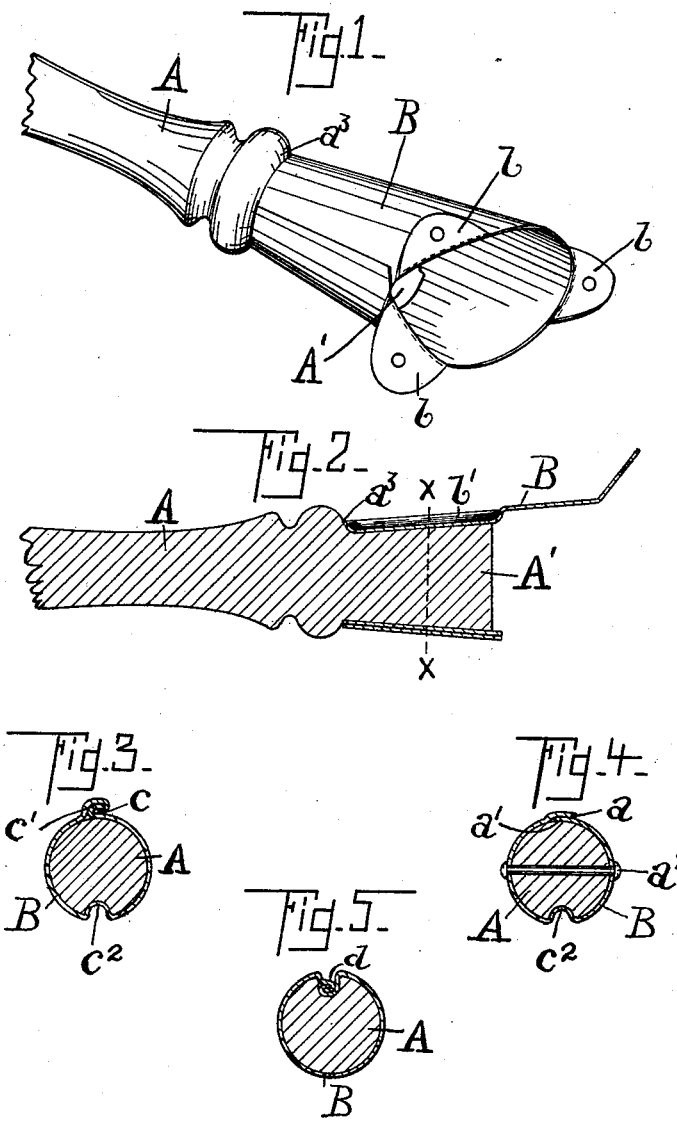
WITNESSES
A. R. Selden
S. P. Moore
INVENTOR
Albert R. Pritchard
BY
Howard L. Osgood
his ATTORNEY

UNITED STATES PATENT OFFICE.

ALBERT R. PRITCHARD, OF ROCHESTER, NEW YORK.

VESSEL-HANDLE.

SPECIFICATION forming part of Letters Patent No. 605,828, dated June 14, 1898.

Application filed May 10, 1897. Serial No. 635,965. (No model.)

*To all whom it may concern:*

Be it known that I, ALBERT R. PRITCHARD, a citizen of the United States, and a resident of the city of Rochester, county of Monroe, and State of New York, have invented certain new and useful Improvements in Vessel-Handles, of which the following is a specification, reference being had to the accompanying drawings, in which—

Figure 1 is a perspective view of that portion of a handle which embodies my invention and which is ready for attachment to the vessel. Fig. 2 is a central longitudinal section of the same portion of a handle, shown in Fig. 1; and Figs. 3, 4, and 5 are cross-sections on the line $x\,x$ of Fig. 2, Figs. 3 and 5 showing modifications.

The object of my invention is to produce a means of attachment of a wooden handle proper to a vessel in a simple and cheap way and which stays the handle firmly and against becoming loose.

My invention consists in the form of the end of the handle proper, in the form of the means for connecting said handle to the vessel, and in the means for fastening said connecting means to the handle proper, as hereinafter described and claimed.

In Figs. 1, 2, and 4 are illustrated a handle proper, A. The end A' of the handle next to the vessel is conically tapered, the largest end of the cone being adjacent to the vessel and the smallest end being farthest therefrom. Around this conical end I fit a conical ferrule B, provided, if convenient, and as shown in Fig. 1, with ears $b$, whereby it may be soldered or riveted to any suitable vessel. The ferrule B is fitted tightly around the conical end A' of the handle, and, as shown in Figs. 1, 2, and 4, the meeting edges $a\,a'$ of the ferrule are lapped over each other and are then soldered together. The parts thus fastened together can be fitted tightly upon each other, and the handle cannot move longitudinally in the ferrule on account of the conical fitting and the fact that the free end of the ferrule in the form shown fits against a shoulder $a^3$ on the handle proper.

It is of course not necessary that the form of the handle or of the ferrule should be conical; but it is evident any form which has not parallel sides and which has the end of the handle next to the vessel larger than another portion clasped by the ferrule and farther away from the vessel is an equivalent for the conical form shown in the drawings.

I provide means for preventing the ferrule from turning on the handle, and among them are those shown in Figs. 2, 3, and 4, in which cases a groove is cut longitudinally in the conical portion A' of the handle and a portion $b'$ of the ferrule is pressed into the groove. This not only pulls those portions of the ferrule outside of the indentation tightly against the handle proper, but it also prevents the ferrule from turning on the handle.

In Figs. 3 and 4 are shown forms of my invention wherein the ends of the ferrule are double-seamed together and the ferrule is locked upon the handle. In these cases each edge $c$ or $c'$ of the ferrule, as in Fig. 3, is turned back upon itself to form a hook, so that the two hooks may interlock in a manner well known. The ferrule is made sufficiently large in diameter to permit these hooked edges to engage with each other after the ferrule is placed around the end A' of the handle. The ends are then hooked together, but the ferrule in this condition is loose because too large for the handle and it is necessary to take up the slack. This is done by pressing a portion $c^2$ of the ferrule into a longitudinal groove in the end of the handle, which groove is so deep that when the portion $c^2$ is seated therein the slack of the ferrule is entirely taken up. A modification of this form of my device is shown in Fig. 5, in which the double seam $d$ is pressed into a groove of sufficient depth to take up the slack of the ferrule.

By use of my invention I am enabled to fit a ferrule of the type set forth tightly upon a handle. A pin $a^2$, Fig. 4, may be used in connection with my ferrule.

In the use of my device the handles are made complete, provided with the conical end A' and with the longitudinal slot along such conical portion. The handles are lacquered or enameled, and the subsequent processes of attaching the ferrules do not injure or crack the enamel, and thus no moisture can enter through the enamel into the wood of the handle to swell or crack the same or to stretch the ferrule by such swelling and permit it to loosen when the handle dries.

What I claim is—

1. The combination of a handle having a conical end largest at the extremity and a longitudinal slot in the conical end; and a conical ferrule adapted for attachment to a vessel having its edges overlapping and fastened together and a portion of the ferrule forced into the slot, whereby the ferrule is contracted to fit tightly upon said conical end.

2. The combination of a handle having a conical end largest at the extremity and a longitudinal slot in said end; and a ferrule adapted for attachment to a vessel having its edges double-seamed together and the double-seamed edges of the ferrule forced into the slot, whereby the ferrule is contracted to fit tightly upon said end.

ALBERT R. PRITCHARD.

Witnesses:
C. SCHUYLER DAVIS,
E. H. MARSELLUS.